United States Patent [19]
Thomsen

[11] 3,713,229
[45] Jan. 30, 1973

[54] DEVICE FOR USE IN TEACHING ACCOUNTING

[76] Inventor: Carl Torben Thomsen, P.O. Box 282 Andrews Station, Berrien Springs, Mich. 49104

[22] Filed: May 10, 1971

[21] Appl. No.: 141,551

[52] U.S. Cl. ............................................. 35/24 C
[51] Int. Cl. .......................................... G09b 19/18
[58] Field of Search ........... 35/24 R, 24 C, 1, 8 R, 10, 35/13, 19 R, 49, 50, 51

[56] References Cited

UNITED STATES PATENTS 1,989,878   2/1935   Mooney ............................. 35/24 C
2,488,423   11/1949  Mooney ............................. 35/24 C

FOREIGN PATENTS OR APPLICATIONS 1,077,942   5/1954   France ............................... 35/19 R Primary Examiner—Wm. H. Grieb
Attorney—Oltsch & Knoblock

[57] ABSTRACT

A device for use in teaching accounting wherein a plurality of upright translucent tubes are positioned alongside an upright panel having horizontal scale indicia. The tubes are connected to a liquid circulatory system having a pump, valve means associated with each upright, and valve control means for selectively controlling the valves and pump for varying the relative levels of liquid in said tubes.

5 Claims, 1 Drawing Figure

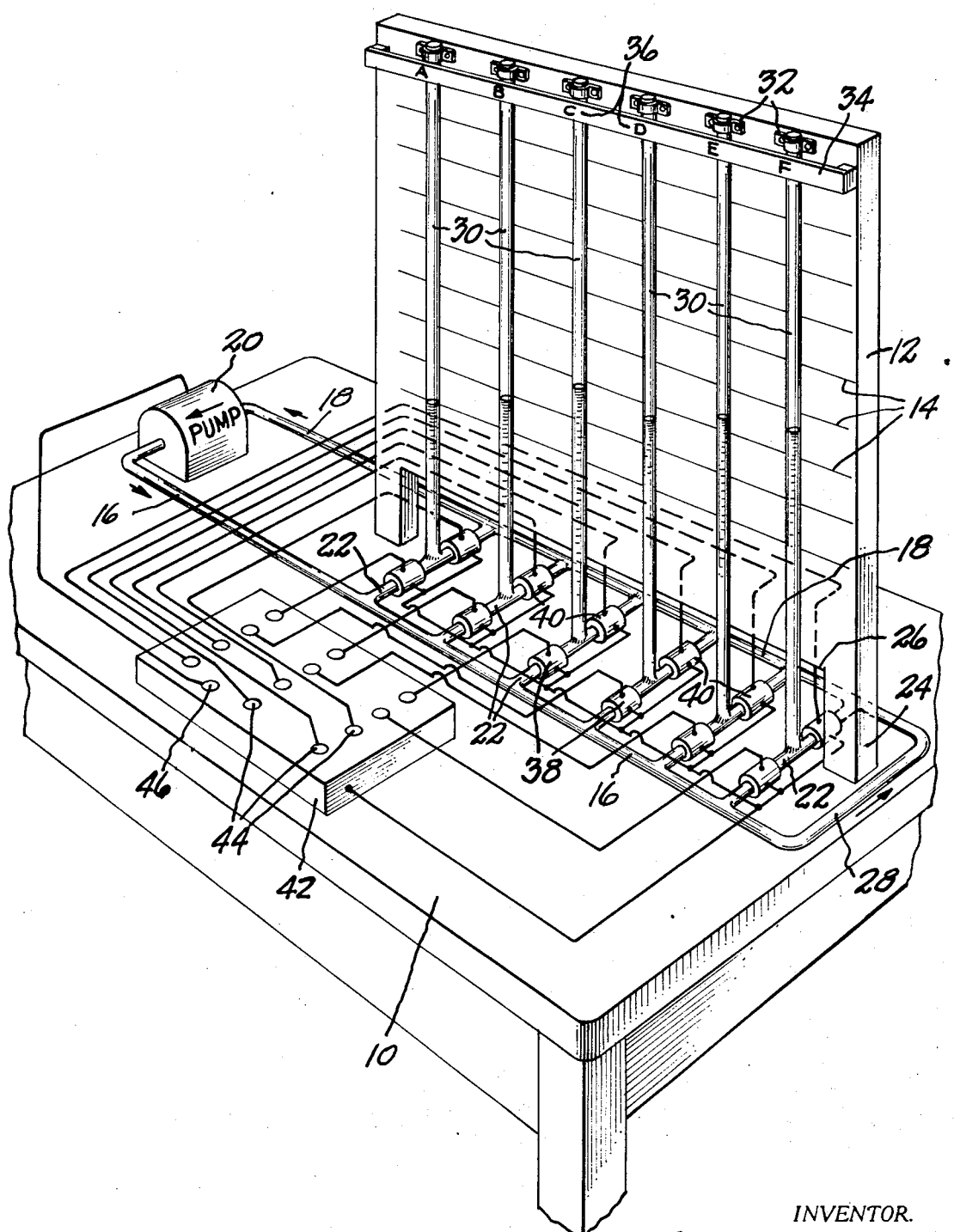

DEVICE FOR USE IN TEACHING ACCOUNTING

BACKGROUND OF THE INVENTION

This invention relates to devices for use in teaching accounting. Visual aids for use in teaching accounting may take many different forms, such as charts and graphs. Such aids are more or less static and are therefore incapable of demonstrating variations in relationships of the elements of accounting problems unless predetermined variations are made the subject of a series of charts which can be considered successively.

Some efforts have been made to produce teaching aids which overcome this limitation. Examples of such prior attempts are seen in U.S. Pat. No. 2,297,011, dated Sept. 29, 1942; and U.S. Pat. No. 2,526,260, dated October 17, 1950, in which the liquid containing tubes of a group are provided with individually adjustable pistons for regulating the height of a liquid column in each tube. Devices of this character require complicated and expensive mechanical components. Another type of device is shown in U.S. Pat. No. 3,317,132, dated May 2, 1967, in which both electrical and mechanical display apparatus is shown. Such electrical apparatus requires complicated circuitry and expensive components; and the mechanical form uses transparent tubes in which balls are selectively fed in various quantities by mechanical means which is quite complicated and which controls the selective feed of the balls to the respective tubes and the selective discharge of the balls from other tubes. Such mechanical devices are expensive and provide for change of proportions of displayed ratios only in steps determined by the size of the balls, rather than in small increments.

SUMMARY OF THE INVENTION

It is the primary object of this invention to provide a visual display device for use in teaching accounting which is simple in construction, inexpensive, which can use standard components for the major number of parts thereof, and which is adapted for quick, accurate operation to reflect changes in various elements of a problem.

A further object is to provide a device of this character wherein a liquid circulating system, including a pump and valves, serves to display selected levels of colored liquid in different display tubes against a background which indicates the relationships of the liquid levels.

Other objects will become apparent from the following specification.

In the drawing:

FIG. 1 is a perspective view illustrating one embodiment of the invention.

DESCRIPTION OF THE PREFERRED EMBODIMENT

Referring to the drawing, the numeral 10 designates a base or support which may constitute the top of a table or a rigid horizontal panel. An upright panel 12 is fixedly mounted upon the support 10 and has a plurality of indicia, such as vertically spaced horizontal lines 14 appearing thereon and defining a scale.

The support 10 mounts a liquid circulating system which includes a conduit 16 extending along the support lengthwise of the panel 12 and preferably at one side thereof, and a conduit 18 extending along the length of the panel 12 upon the support 10 and preferably at the side of the panel 12 opposite that at which the conduit 16 is located. Conduits 16 and 18 are connected at one end to a pump 20 in a manner such that one of the conduits, such as 18, may be connected to the pump inlet; and the other conduit, such as 16, may be connected to the pump outlet. At spaced intervals along the lengths of the conduits 16 and 18 said conduits are interconnected by cross conduits 22 which are preferably located adjacent to the panel 12.

The panel 12 may be mounted upon support 10 by means of supporting legs 24 at the ends thereof, thereby positioning the lower edge 26 of the panel spaced above the support 10. The cross conduits 22 are preferably located between the panel legs 24. If desired, a cross conduit 28 may also interconnect the conduits 16 and 18, but the use of a cross conduit 28 is optional.

Each of the cross conduits 22 has connection and communication with a vertical conduit or tube 30 which is open at its upper end and which is juxtaposed to the panel 12 at the face thereof bearing scale indicia 14. The vertical tubes 30 are of the same cross sectional size and the same length, and at least the portion thereof adjacent the scale indicia 14 is translucent or transparent. The upper end of each tube 30 is supported by means of a bracket 32 or other member which is carried by the upper portion of the panel 12. At its upper portion the panel 12 may mount an indicia panel 34, here illustrated as spaced from the face of panel 12 which bears indicia 14 so as to extend outwardly of the upper ends of the adjacent vertical tubes 30. Panel 34 bears indicia 36, here illustrated as letters but which may constitute words or the like, indicating a condition which the tube adjacent thereto reflects in the accounting problem, such as rent, payroll, cost of goods, taxes, surplus, profit, or the like.

Each of the conduits 22 has interposed therein means for selectively opening or closing its connected tube 30 for communication with a selected one of the conduits 16 and 18. As here shown, this means constitutes valves 38 and 40. Valve 38 is interposed in each cross conduit 22 between the conduit 16 and the vertical conduit 30, and valve 40 is interposed in each cross conduit 22 between the vertical conduit 30 and the conduit 18. Valves 38 and 40 are preferably of the electrically operated type, such as solenoid-actuated valves.

The valves 38 and 40 are connected with a control console 42 having a plurality of switches (not shown) each operable to control an electrical circuit to a selected valve by a pushbutton or other manual actuator. The control console which also includes a switch operable by a pushbutton or other actuator 46 which controls an electric circuit for actuating the pump 20.

The liquid circulating system of the apparatus contains a quantity of colored liquid of an amount sufficient, when static, to fill each of the tubes 30, except one, to the level of the lowermost or zero indicia 14 of the scale upon the panel 12, and to fill the remaining tube 30 to the level of the uppermost or 100 percent horizontal indicia 14 of the scale upon the panel. At least the portions of the vertical tubes 30 adjacent to the indicia bearing panel 12 are translucent or transparent so that the liquid level in each of the tubes 30 can be viewed. Suitable illuminating means (not shown) may be provided in connection with the device to ensure adequate illumination for viewing by a number of persons, such as students in a classroom.

The console 42 may be of a type which is portable so that it can be used by an instructor or lecturer standing at one side of or at a distance from the device to avoid obscuring the vision of the device by the students or audience, while at the same tim permitting the instructor to observe the device to make sure that it is functioning in the manner to properly illustrate his instruction.

In the use of the device, assuming that the proper quantity of liquid is contained in the liquid circulating system thereof constituting the pump, the various conduits and tubes 30 to ensure that the composite of liquid levels in all of the tubes when read relative to scale indicia 14 totals 100 percent or any other desired amount, the device can be operated to effect any desired proportioning of the liquid in the various tubes 30 to reflect the elements of a given accounting problem or condition, such as the condition illustrated wherein the liquid levels in the various tubes 30 differ. When the instructor then discusses a change in the problem or condition is explained, the practical effect thereof can be visually displayed by opening the valve or valves 40 in one or more selected cross conduits 22 while simultaneously opening the valve or valves 38 in different selected cross conduits 22. In this manner the liquid level in the conduits 30 associated with the valves 40 which are opened is lowered, and the liquid level in the tubes 30 associated with the valve or valves 38 which are opened is raised, assuming of course that the pump 20 is functioning. The extent of change in each tube 30 is determined by the individual control of the valve associated therewith which has previously been opened.

In cases where the cross conduit 28 is provided in the liquid circulating system so that the conduits 16 and 18 are always in communication, the pump 20 may operate continuously. In cases where a cross conduit 28 is not provided in the system and each of the cross conduits 22 between longitudinal conduits 16 and 18 is valved and normally closed, the control of liquid level requires manipulation of pump controlling pushbutton 46 simultaneously with manipulation of the switch buttons 44 associated with selected valves 38 and 40 to produce the desired operation of the device.

It will be understood that any selected number of vertical display tubes 30 may be provided in the device. Also means (not shown) may be provided for varying the indicia 36 which identify the element or condition which is measured by the liquid level in each tube. The number of tubes 30 selected will preferably be a number equal to or exceeding the number of components or conditions which are contained in the problems for which the device is used.

It is not necessary that each problem contain a number of elements or conditions equal to the number of tubes 30. Thus in problems which contain a number of elements or components less than the number of tubes 30, the liquid level of tubes 30 of the excess number may be reduced to the zero indicator 14 of the scale, and indicia 36 associated with those tubes may be removed or indicia may be used relative to the excess tubes which indicates that they are not representative of elements of the problem or condition. Thus in the device shown, any group of two, three, four, five or six tubes could be used for display purposes.

While the device is primarily intended for and was designed for use in teaching accounting, it is also useful for other purposes. Thus any condition involving ratios of different conditions or quantities can be visually displayed, and the effect of variations in individual conditions, quantities or components can be demonstrated by selectively controlling the liquid levels of two or more of the vertical tubes. In such uses the indicia 14 may indicate numbered quantities instead of percentages.

What I claim is:

1. A device of the character described comprising a support having a substantially vertical panel with vertically spaced horizontal indicia, a plurality of substantially vertical translucent tubes of similar cross sectional size carried by said support alongside said panel adjacent said indicia, and liquid circulating means interconnecting the lower ends of said tubes and including at least one control valve associated with each tube and a pump, said valves being manipulable to selectively regulate the liquid level in each vertical tube, said liquid circulating means and tubes containing a quantity of liquid exceeding the capacity of said circulating means per se.

2. A device as defined in claim 1, wherein said tube interconnecting means includes a pump intake line, a pump outlet line and cross conduits each connecting a vertical tube to said pump intake and pump outlet lines.

3. A device as defined in claim 2, wherein a valve is located in each cross conduit between said pump intake line and said vertical tube, and a second valve is located in each cross conduit between said pump outlet line and said vertical tube.

4. A device as defined in claim 3, wherein said tube interconnecting means includes an open conduit portion connecting said pump intake line and said pump outlet line.

5. A device as defined in claim 1, wherein each valve is actuated by a solenoid, and electrical control means for selectively actuating said solenoids and said pump.

* * * * *